UNITED STATES PATENT OFFICE.

JOSEPH KOETSCHET AND MAURICE BEUDET, OF LYON, FRANCE, ASSIGNORS TO SOCIETE CHIMIQUE DES USINES DU RHONE, (ANCIENNEMENT, GILLIARD, P. MONNET ET CARTIER,) OF PARIS, FRANCE.

PRODUCTION OF ACETIC ANHYDRID AND ACETALDEHYDE.

1,298,356. Specification of Letters Patent. Patented Mar. 25, 1919.

No Drawing. Application filed June 11, 1918. Serial No. 239,353.

*To all whom it may concern:*

Be it known that we, JOSEPH KOETSCHET, a citizen of the Swiss Republic, of 67 Boulevard des Belges, Lyon, France, and MAURICE BEUDET, a citizen of the Republic of France, of 25 Rue Bugeaud, Lyon, France, have invented certain new and useful Improvements in or Relating to the Production of Acetic Anhydrid and Acetaldehyde, of which the following is a specification.

Ethylidene diacetate is a body which is relatively unstable under heat.

Geuther, who first prepared it (*Liebig's Annalen* Vo. 106, page 249) already observed that this body gradually decomposes and becomes acid when subjected to repeated rectifications, but he did not ascertain the exact nature of the phenomenon.

Later on, Wegscheider and Spaeth (*Centralblatt* 1910 (1) page 1422) observed that this decomposition is favored by the presence of calcium chlorid.

To accentuate this decomposition and consequently obtain in considerable proportion, the substances to which it could give rise, it would naturally occur to one to overheat the ethylidene diacetate, or to boil it in presence of catalyzers more powerful than calcium chlorid.

These are in fact the modes of operation which form the subject of the English Patent No. 23190 of 1914 dated 17 January 1914.

In this patent the overheating is effected at temperatures between 250° and 300°. As regards the catalyzers, their action is utilized at the boiling temperature of the diacetate. Further, it is sought to accentuate this action by accompanying it with a slight overheating, produced, in the apparatus employed, by the long column by which the apparatus is surmounted.

In all cases a mixture of aldehyde, anhydrid and acetic acid escapes from the reaction vessel and has then to be separated.

The practical carrying out of this process is not unattended by drawbacks. Owing to the high temperature to which the diacetate is subjected, sometimes in presence of powerful catalyzers, such as sulfuric acid, secondary reactions always occur, and in numerous cases an intense formation of tar is observed.

Further, the catalyzer is often destroyed, and its concentration relatively to the diacetate increases in proportion as the operation proceeds, this latter fact being very disadvantageous in the majority of cases.

Moreover one has at the end of the operation a distillate consisting of a mixture of aldehyde, partly polymerized, acetic acid and acetic anhydrid. Now when large quantities are dealt with, the separation of these constituents is a delicate matter, in view of the ease with which the anhydrid and the aldehyde recombine, especially when they are accompanied by traces of catalyzers (acids, acid salts, neutral salts of strong acids etc.)

The applicants have now found that it is possible on the one hand to effect the decomposition of ethylidene diacetate into acetaldehyde and acetic anhydrid with quantitative yields, and on the other hand to effect in a single operation the decomposition of the diacetate and the separation of the two resulting products.

To obtain the first of these results, it suffices to heat the ethylidene diacetate in presence of appropriate catalyzers, well below its boiling point; under these conditions the conversion of the ethylidene diacetate into acetaldehyde and acetic anhydrid is effected normally without causing formation of tar or secondary reactions. To obtain, moreover, the second result, it is advisable to maintain the temperature of the reaction even below the boiling point of the acetic anhydrid: the acetaldehyde then escapes alone from the reaction vessel in which the anhydrid accumulates.

The elimination of the acetaldehyde may also be assisted by entraining it by a current of dry air.

One can naturally carry out the decomposition of the whole of the diacetate taken, or arrest the decomposition when a fraction still remains unaltered. In this latter case, the anhydrid formed may be separated easily by rectification, from the remaining diacetate.

The relatively very low temperatures at which the working is effected likewise permit, when a very energetic catalyzer is employed, of modifying the action of the catalyzer, by diluting the ethylidene diacetate with an appropriate solvent, and in particular, with acetic acid and acetic anhydrid.

The applicants have also found that when the catalyzer employed is soluble neither in the diacetate, nor in the anhydrid, nor in the mixture of these two substances, it is very advantageous to use it in solution in a neutral body, not susceptible of distilling at the temperature at which the operation is conducted.

Example I:

| | Parts. |
|---|---|
| Ethylidene diacetate | 500 |
| Sodium pyrosulfate | 15 | are heated in a distilling vessel at 125°–140° C. 120 to 150 parts of acetaldehyde distil over and are collected. The acetic anhydrid remains in the apparatus and is purified by rectification.

The yield is approximately theoretical.

Example II: One works as stated in Example I, with a mixture consisting of:

| | Parts. |
|---|---|
| Ethylidene diacetate | 500 |
| Monosodic orthophosphate | 30 |

The reaction takes place very well at about 130° C.

Example III: Into 500 parts of ethylidene diacetate contained in a distilling apparatus are run 35 parts of finely powdered metaboric acid. While maintaining strong stirring, the mixture is heated at 110°–130° C., and a small current of dry air is bubbled through the mixture. This current, suitably cooled on issuing from the apparatus and then washed, deposits:

| | Parts. |
|---|---|
| Acetaldehyde | 100 |

There remain in the apparatus

| | Parts. |
|---|---|
| Acetic anhydrid | 230 |
| Unaltered diacetate | 170 |

Example IV: Into a distilling apparatus containing:

| | Parts. |
|---|---|
| Ethylidene diacetate | 250 |
| Acetic anhydrid | 100 | are charged:

| | Parts. |
|---|---|
| Sulfacetic acid | 5 |

The mixture is heated at 125°–135° C. and 70 parts of aldehyde distil over.

The anhydrid which remains in the apparatus is not contaminated with tar.

Example V: In the following example the use of a neutral solvent for the catalyzer is combined with the employment of a catalyzer which is insoluble in the diacetate or in the anhydrid; 5 parts of metaboric acid are dissolved hot in 100 parts of a heavy petroleum having a boiling point at from 200° to 250° C. Into this solution are poured 500 parts of ethylidene diacetate whereupon the solution is heated without agitating up to a temperature of from 100° to 130° C. Results are thereby obtained analogous to those indicated above in connection with Example III.

What we claim as our invention, and desire to secure by Letters Patent, is:—

1. A process of making acetaldehyde and acetic anhydrid, comprising heating ethylidene diacetate in presence of a catalyzer while maintaining the temperature below the boiling point of the ethylidene diacetate.

2. A process of making acetalydehyde and acetic anhydrid, comprising heating ethylidene diacetate in presence of a catalyzer while maintaining the temperature below the boiling point of acetic anhydrid and above that of the acetaldehyde, whereby the decomposition of the ethylidene diacetate and separation of acetaldehyde from acetic anhydrid are effected simultaneously.

3. A process of making acetaldehyde and acetic anhydrid, comprising heating ethylidene diacetate in presence of a catalyzer while maintaining the temperature below the boiling point of acetic anhydrid and above that of the acetaldehyde, and entraining the evolved acetaldehyde by a current of dry air.

4. A process of making acetaldehyde and acetic anhydrid, comprising heating ethylidene diacetate in presence of a catalyzer and of a diluent capable of moderating the action of the catalyzer, while maintaining the temperature below the boiling point of the ethylidene diacetate.

5. A process of making acetaldehyde and acetic anhydrid, comprising heating ethylidene diacetate in presence of a catalyzer and of a diluent capable of moderating the action of the catalyzer, while maintaining the temperature below the boiling point of acetic anhydrid and above that of acetaldehyde.

6. A process of making acetaldehyde and acetic anhydrid, comprising heating ethylidene diacetate in presence of a catalyzer dissolved in a solvent indifferent to the reaction, while maintaining the temperature below the boiling point of the ethylidene diacetate.

7. A process of making acetaldehyde and acetic anhydrid, comprising heating ethylidene diacetate in presence of a catalyzer dissolved in a solvent indifferent to the reaction while maintaining the temperature below the boiling point of acetic anhydrid and above that of acetaldehyde.

In testimony whereof we have signed our names to this specification.

JOSEPH KOETSCHET.
MAURICE BEUDET.

In the presence of—
GRADY CORBITT,
MARIN VACHON.